United States Patent
Shapess

[11] Patent Number: 5,498,097
[45] Date of Patent: Mar. 12, 1996

[54] GENERATOR SET MOUNTING CLAMP

[75] Inventor: Robert P. Shapess, Cato, N.Y.

[73] Assignee: Carrier Corporation, Syracuse, N.Y.

[21] Appl. No.: 173,037

[22] Filed: Dec. 27, 1993

[51] Int. Cl.$^6$ .................................................. B25G 3/38
[52] U.S. Cl. ..................... 403/322; 403/315; 403/319; 410/77; 410/82; 24/287; 24/593; 248/222.14; 248/222.52
[58] Field of Search ................. 403/319, 315, 403/316, 317, 318, 321, 322, 353; 410/77, 82; 248/300, 222.1, 222.3; 24/593, 287

[56] References Cited

U.S. PATENT DOCUMENTS

| | | | |
|---|---|---|---|
| 1,346,955 | 7/1920 | Gustafson | 248/300 X |
| 3,456,967 | 7/1969 | Tanhinger et al. | 24/287 |
| 3,788,683 | 1/1974 | Rumell | 410/82 X |
| 3,892,436 | 7/1974 | Fathauer | 410/82 X |
| 3,989,294 | 11/1976 | Carr | 410/82 |
| 4,139,228 | 2/1979 | Varadi | 410/82 X |
| 4,398,101 | 7/1983 | Richer | 24/593 X |
| 4,732,360 | 2/1987 | Bodenheimer . | |
| 4,834,572 | 11/1988 | Harrington et al. . | |
| 5,002,418 | 3/1991 | McCown | 24/287 X |
| 5,139,359 | 8/1992 | Kakar et al. | 410/82 X |

OTHER PUBLICATIONS

Advertising brochure "Clip–on Genset Clamp" Buffers U.S.A. Inc. Received Aug. 4, 1993.
User Instructions "Clip–on Genset Clamp" Model RL 1101, Buffers U.S.A. Inc. 4 pages Received Aug. 4, 1993.

*Primary Examiner*—Randolph A. Reese
*Assistant Examiner*—Heather Chun Shackelford

[57] ABSTRACT

A mounting clamp for mounting a power supply to a thermal freight container wherein a stop is employed for insertion into the ISO castings of the thermal freight container and for clamping the power supply to the thermal freight container. A shaft with the stop attached on one end is supported by a base such that the shaft may rotate around and move along its longitudinal axis. A handle is attached to the shaft such that rotation of the handle causes the shaft to rotate which in turn causes the stop to rotate. A locking device is provided to engage the handle for locking the rotational movement of the handle in either a clamp or unclamp position. A fastening device cooperates with the shaft such that it controls the shaft's movement along its longitudinal axis.

4 Claims, 3 Drawing Sheets

5,498,097

GENERATOR SET MOUNTING CLAMP

BACKGROUND OF THE INVENTION

1. Field of the Invention

This invention relates generally to mounting clamps and specifically to mounting clamps for facilitating the mounting and removing of power supplies from thermal freight containers.

2. Description of the Background Art

Thermal freight containers include an electric motor for driving a refrigerant compressor. The electric motor requires an external electric power source which may be found either at the storage site or on the transport platform of the thermal freight container. However, when no other power source is available, a temporary power source which includes a motor generator set, commonly known as a "gen set" may be mounted to the thermal freight containers.

The gen sets are mounted to International Standards Organization ("ISO") corner castings of the thermal freight containers. These ISO corner castings include openings for receiving and cooperating with connecting devices which are used for attaching the gen sets. A gen set is both large and heavy; thus, a fork lift is required to properly position the gen set for mounting it to the thermal freight containers. The connecting devices which are used to mount the gen set to the thermal freight containers are located on each side of the gen set. The connecting devices require precise alignment of the gen set and the ISO corner castings for proper mounting. However, it is frequently difficult to obtain precise alignment of the gen set and the ISO corner castings because of the large size and weight of the thermal freight containers, non-smooth ground surfaces, and/or damaged or warped thermal freight containers. Additionally, the connecting devices commonly include protruding elements, such as long levers, which are susceptible to damage when installing or removing the thermal freight containers. The connecting devices are also difficult to disassemble, which makes repair or maintenance of the connecting devices arduous.

SUMMARY OF THE INVENTION

It is an object of the present invention to provide a mounting clamp for mounting a gen set to ISO corner castings of a thermal freight container which does not require precise alignment of the mounting clamp and the ISO corner castings to properly secure the gen set to the thermal freight container.

It is a further object of the present invention to provide a mounting clamp for mounting a gen set to ISO corner castings of a thermal freight container which eliminates protruding elements that are susceptible to damage when installing or removing the thermal freight containers.

It is a further object of the present invention to provide a mounting clamp for mounting a gen set to ISO castings of a thermal freight container which is easy to disassemble and maintain.

These and other objects of the present invention are achieved by a mounting clamp for mounting a power supply to a thermal freight container wherein a stop is employed for insertion into the ISO castings of the thermal freight container and for clamping the power supply to the thermal freight container. A shaft with the stop attached on one end is supported by a base means such that the shaft may rotate around and move along its longitudinal axis. A handle means is attached to the shaft such that rotation of the handle means causes the shaft to rotate which in turn causes the stop to rotate. A locking means is provided to engage the handle means for locking the rotational movement of the handle means in either a clamp or unclamp position. A fastening means cooperates with the shaft such that the fastening means governs the shaft's movement along its longitudinal axis.

When mounting the power supply to the thermal freight container, the locking means is released, the handle means is placed and automatically locked in the unclamp position, and the fastening means is adjusted to allow the stop to move away from the base means for inserting the stop into the opening of the ISO castings of the thermal freight container. Once the stop is inserted into the opening of the ISO casting, the locking means is released, the handle means is moved and automatically locked in the clamp position, and the fastening means is adjusted to move the stop toward the base means until the stop tightly clamps the ISO corner casting. When removing the power supply from the freight container, the fastening means is adjusted to allow the stop to move away from the base means so that the stop does not tightly clamp the ISO casting, the locking means is released, the handle means is moved and automatically locked to the unclamp position, and the power supply is moved away from the thermal freight container so that the stop moves out of the opening in the ISO castings.

Among the advantages of the present invention are: (1) shaft movement along its longitudinal axis, eliminating the requirement of precise alignment of the mounting clamp and the thermal freight container in order to properly secure the gen set to the ISO corner castings; (2) easy adjustment of the fastening means providing correction for misalignments between the mounting clamps and the thermal freight container; (3) elimination of protruding elements which are susceptible to damage when installing or removing the thermal freight container; (4) ease of disassembly for repair or maintenance purposes.

The foregoing and other objects, features and advantages of the present invention will become more apparent in light of the following detailed description and accompanying drawings.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DETAILED DESCRIPTION OF THE PREFERRED EMBODIMENT

Figure 1:
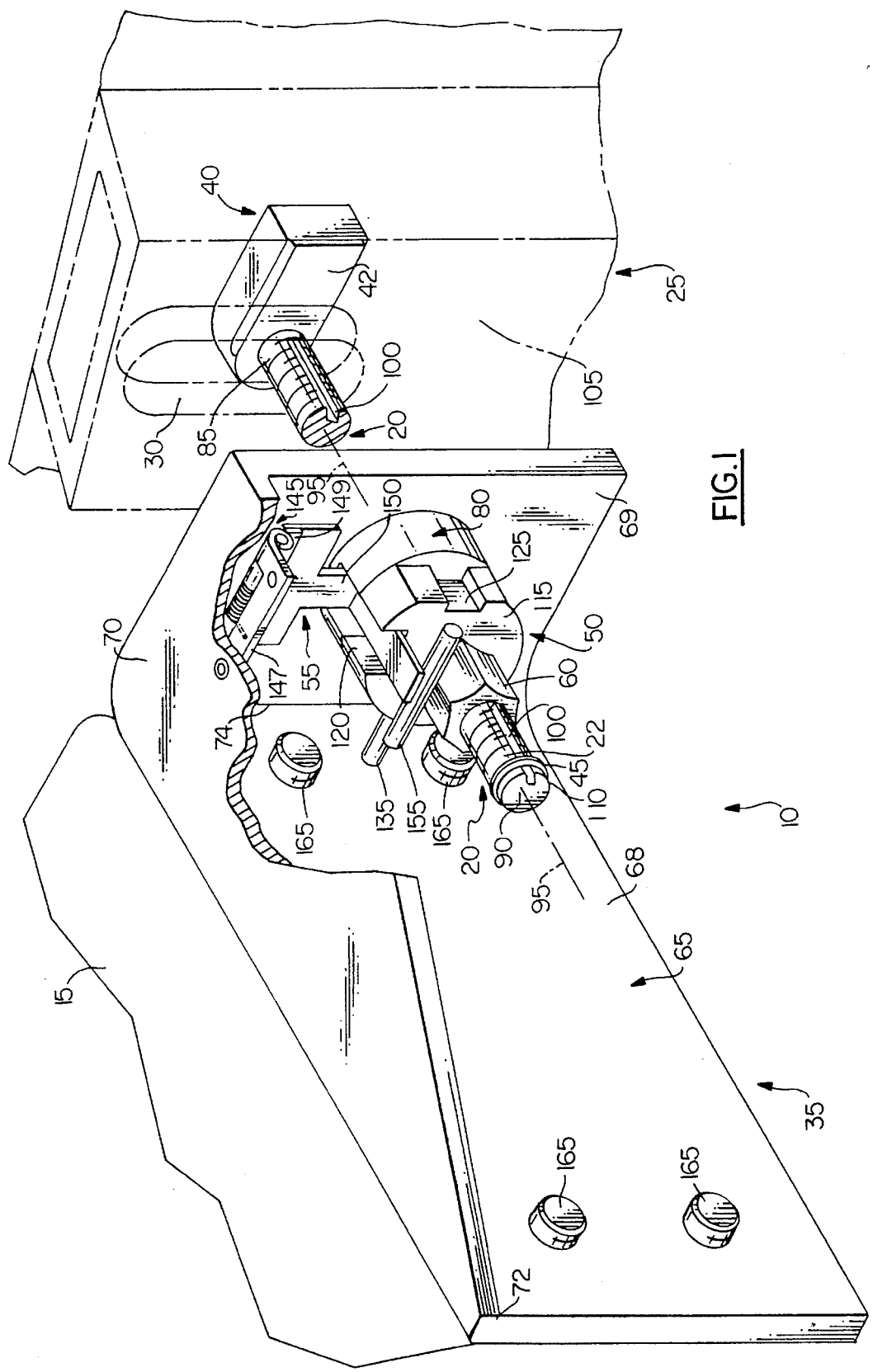
FIG. 1 is a perspective view of the present invention with the shaft exploded forward to show its engagement with the ISO corner casting.

FIG. 1 is a perspective view of a mounting clamp 10 attached to one side of a gen set 15 with the shaft 20 exploded forward to show the mounting clamp 10 cooperating with an ISO corner casting 25 of a thermal freight container. A mounting clamp similar to mounting clamp 10 is located at the opposite side of the gen set 15, which is clamped to another ISO corner casting 25. Each ISO corner casting 25 includes elliptical openings, such as opening 30, for cooperating with mounting clamp 10. The mounting clamp 10 includes a base 35, a shaft 20, a stop 40, a retaining ring 45, a handle means 50, a locking means 55, and a fastening means 60.

The base 35 includes a large L-shaped plate 65 having a first 68 and second end 69, and a small triangular plate 70 which are interconnected along edges 72, 74 and cooperate to support the mounting clamp 10. The large L-shaped plate 65 is structured such that the first end 68 is mounted to the gen set 15 via mounting bolts 165 and the second end 69 is perpendicular to the first end 68 for cooperating with the ISO corner casting 25 as will be explained hereinbelow. The base means further includes a block 75 (shown in FIG. 2) and a support housing 80. The block 75 is structurally attached to the side of the second end 69 of the plate 65 facing the ISO corner casting 25. The placement and the cooperation of the block 75 will be explained hereinafter. The support housing 80 is structurally integrally attached to the second end 69 of the large L-shaped plate 65 and extends outwardly from both sides of the second end 69 of the plate 65. The portion 81 (shown in FIG. 3) of the housing 80 extending beyond the second end 69 of the plate 65, on the side facing the ISO corner casting 25, is configured to be received in the opening 30 in the ISO corner casting wall 105 such that as the gen set 15 is mounted to the ISO corner casting 25 the housing 80 provides support for the gen set 15 by bearing the load of the gen set 15 as will be explained hereinbelow.

Figure 2:
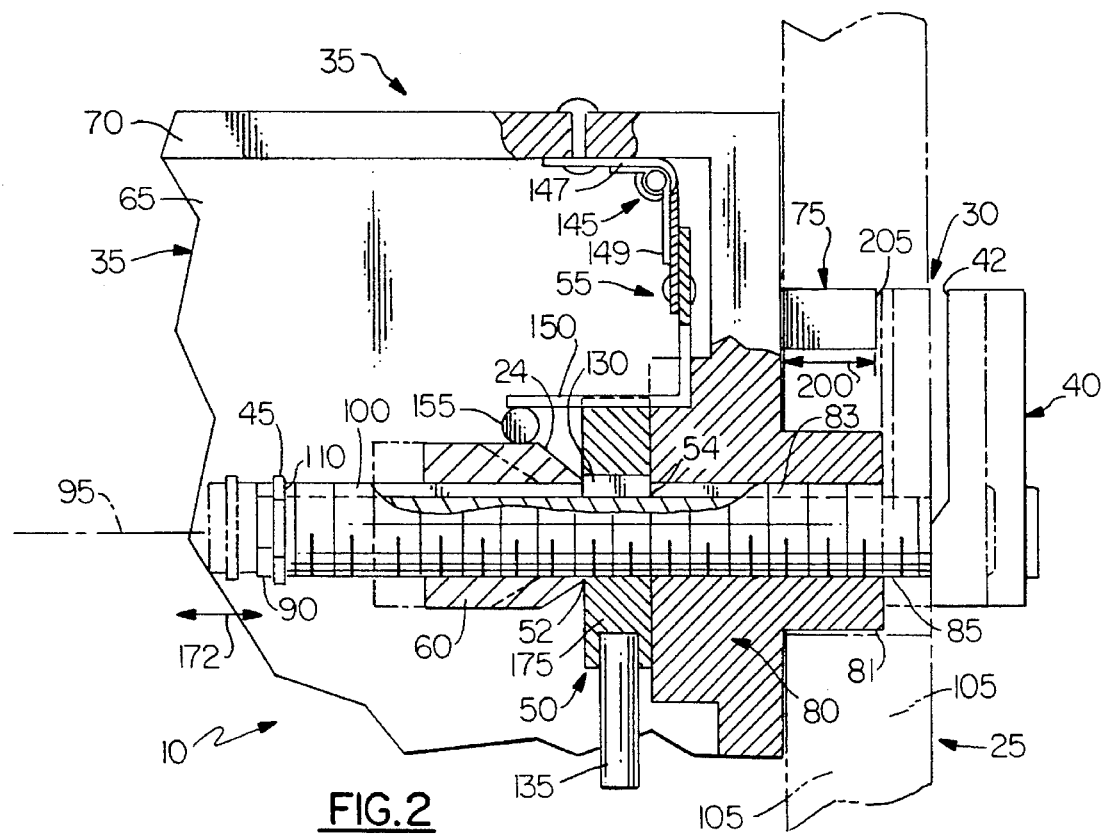
FIG. 2 is a sectional view of the present invention demonstrating the movement of the shaft along its axis, with the stop shown in an unclamp position.

Referring now to FIG. 2, the housing 80 is provided with a bore 83 extending therethrough from one end to the other. The shaft 20, having a first end 85, a second end 90, and a longitudinal axis 95, is received in the bore 83 so as to allow the shaft 20 to freely move rotationally and along its longitudinal axis 95. The movement of the shaft 20 along its longitudinal axis 95 is illustrated by the phantom lines of the shaft 20 and the stop 40, and by the arrow 172. The shaft 20 has a male thread 22 (shown in FIGS. 1 & 2) formed on the exterior thereof and has a keyway 100, both of which may extend the length of the shaft 20.

Attached to the first end 85 of the shaft 20 is a stop 40 which extends radially outwardly, for a determined dimension, from the shaft axis 95. The determined dimension is such that it allows the stop to fit through the elliptical opening 30 in the ISO corner casting 25 when the stop 40 is oriented vertically upward, and allows the stop to be behind the ISO corner casting wall 105 when the stop 40 is oriented horizontally after it has been inserted through the elliptical opening 30 (as shown in FIG. 1).

Figure 3:
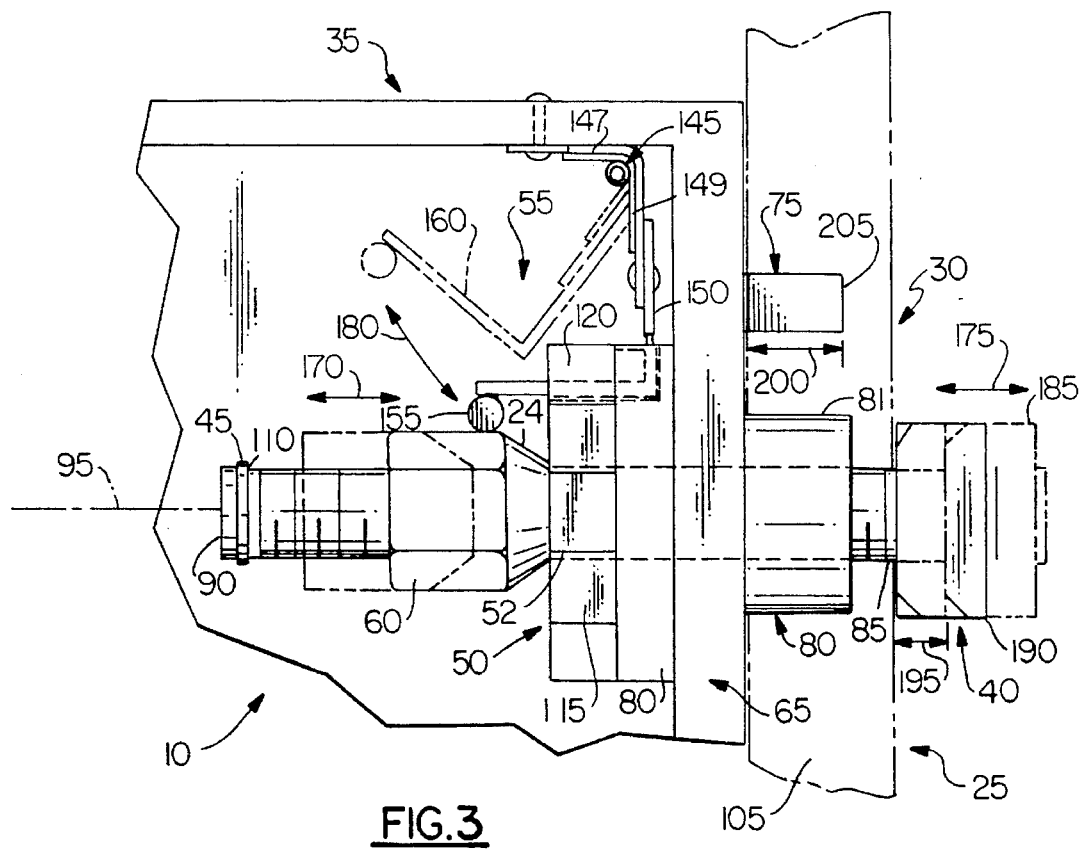
FIG. 3 is an elevational view of the present invention with the stop shown in a clamp position.

The second end 90 of the shaft 20 has a circumferential groove 110 defining an area of reduced diameter formed therein immediately adjacent to the left hand facing surface of the second end 90 of the shaft 20 as shown in FIGS. 1, 2, 3. The groove 110 is adapted to receive and retain a retaining ring 45 having a central opening therethrough which defines an inner diameter which allows it to be received in and retained by the groove 110. The retaining ring 45 serves to prevent unwanted disengagement of the handle means 50 and the fastening means 60 from the shaft 20.

The handle 50 includes a control 115 which is provided with a clamp position slot 120 and a unclamp position slot 125 (shown in FIG. 1). The slots 120 and 125 each define an area which is suitable for receiving a locking means which includes a hinge arm 150 as will be explained hereinafter. The handle also includes a key 130, an index pin 135, and a grease fitting 140 (shown in FIGS. 4, 5).

The control 115 is provided with a bore 52 extending therethrough from one end to the other. The bore 52 includes a slot 54 (shown in FIG. 2) which defines a rectangular area such that the key 130 may be fastened to the slot 54 while leaving a portion of the key 130 extended beyond the slot 54 and into the bore 52. As the shaft 20 is received in the bore 52, the key 130, which is fastened to the slot 54 in the control 115 is slidingly received in the keyway 100 in the shaft 20 such that the key 130 secures the handle 50 to the shaft 20. As a result of the key 130 being both fastened to the slot 54 in the handle 50 and inserted into the keyway 100 of the shaft 20, rotation of the handle 50 causes the shaft 20 to rotate which in turn causes the stop 40 attached to the shaft 20 to rotate. At the same time the control and handle are free to move longitudinally with respect to the shaft 20.

Figure 5:
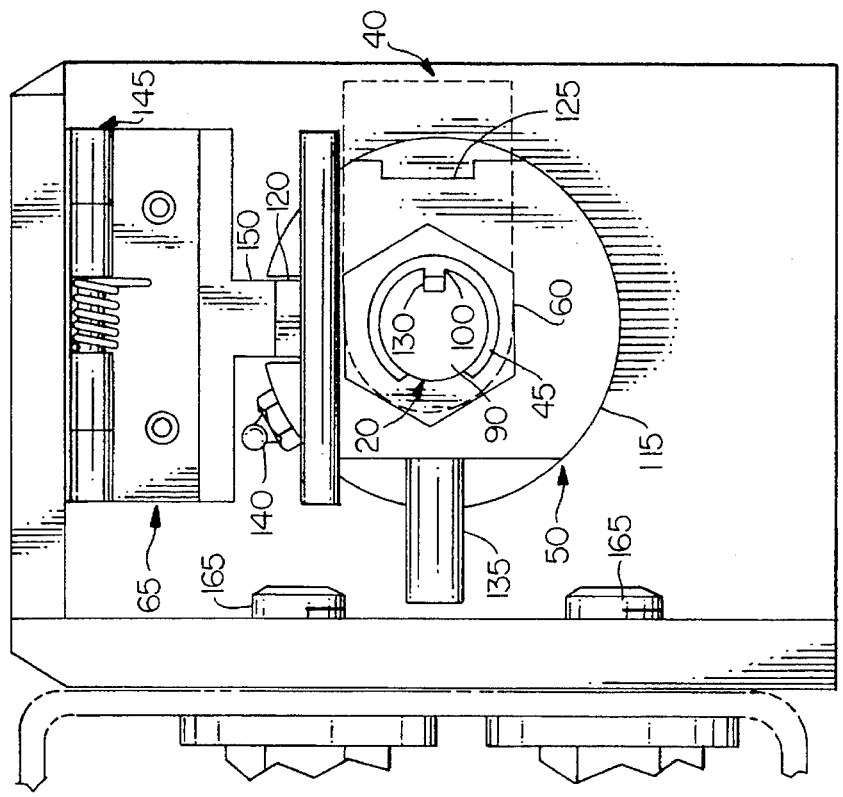
FIG. 5 is an end view of the present invention with the stop shown in a clamp position by a hidden line.
Figure 4:
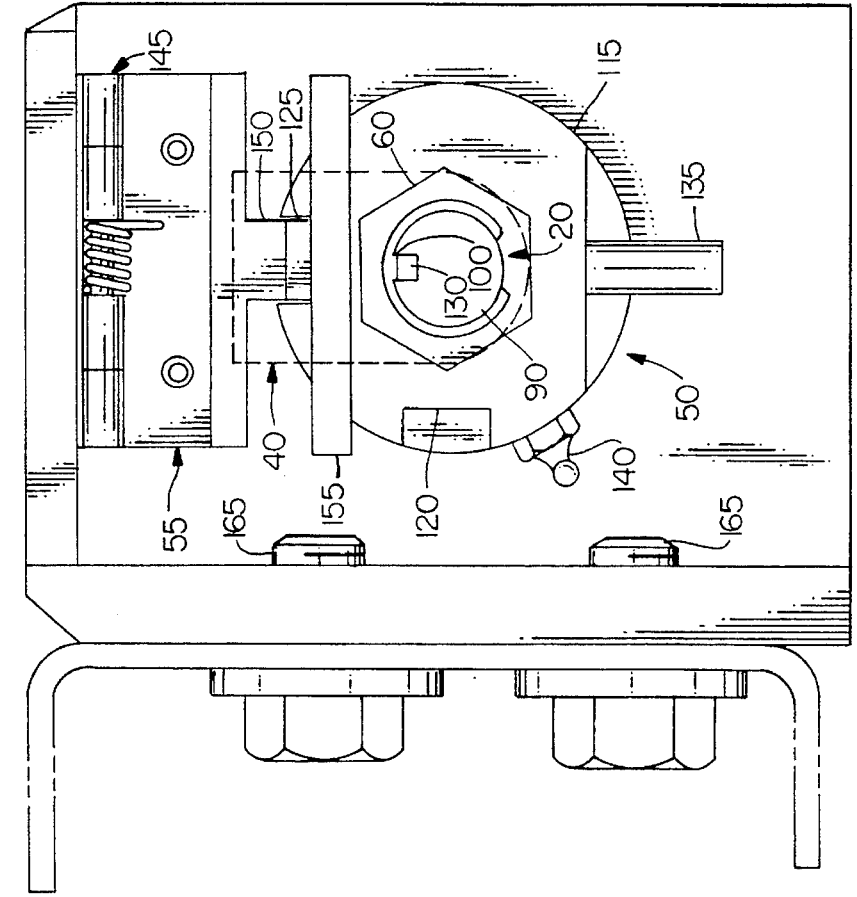
FIG. 4 is an end view of the present invention with the stop shown in an unclamp position by a hidden line.

The index pin 135 is attached to the control 115 for indicating the orientation of the stop 40. For example, if the stop 40 is inserted into the opening 30 of the ISO corner casting 25, its orientation cannot be directly observed, however the index pin 135 may be easily observed to indicate whether the hidden stop 40 is vertical or horizontal (i.e., unclamp or clamp position shown in FIGS. 4, 5 respectively). The grease fitting 140, shown in FIGS. 4, 5, is attached to the control 115 so as to facilitate applying lubricant to the shaft 20. Once the lubricant is applied to the grease fitting 140 it travels through a bore (not shown) in the control 115 to the keyway 100 along the length of the shaft 20. Grease fittings of this type are well known in the art. The rotational movement of the handle means 50 may be locked by the locking means 55.

Referring to FIG. 3, the locking means 55 includes a hinge 145 having a first 147 and a second end 149, a hinge arm 150, and a lock bar 155. The first end 147 of the of the hinge 145 is attached to the small triangular plate 70 of the base means 35, and the second end 149 of the hinge 145 is connected to the hinge arm 150 which in turn is connected to the lock bar 155. The locking means 55 is biased toward the handle 50 and is positioned such that it applies pressure against the control 115 of the handle means 50. If the slots 120, 125 of the handle means 50 (shown in FIG. 1) are aligned with the hinge arm 150, the hinge 145 will drive the hinge arm 150 into the slots 120, 125 and cause the locking means 55 to lock the rotational motion of the handle means 50 in the respective position (either the clamp or unclamp position) until the locking means 55 is released by lifting the locking means 55 as shown by the phantom line 160 and the arrow 180. The locking of the rotational motion of the handle means 50 locks the rotational motion of the shaft 20 which in turn locks the rotational motion of the stop 40.

The fastening means 60 may be any device which cooperates with the shaft 20 such that the it controls the shaft's movement along its longitudinal axis 95. If the shaft 20 has a male thread 22, as described above, the fastening means 60 may be a nut having a female thread formed on the interior thereof for mating with the shaft 20. A tapered section 24 of the fastening means 60 applies pressure against the handle means 50 as the fastening means 60 is adjusted to cause the shaft 20 to pull the stop 40 toward the mounting clamp 10, thus providing a clamping action which will be described hereinafter. The bias of the hinge 145 causes the lock bar 155 to apply pressure on the fastening means 60, thus securing the fastening means 60 in the desired position; this will prevent unwanted movement of the fastening means caused by vibrations. The retaining ring 45 on the second end 90 of the shaft 20 prevents disengagement of the fastening means 60 from the shaft 20. The mounting clamp 10 operates as follows.

Referring to FIG. 1, the base means 35 includes four mounting bolts 165 which firmly secure mounting clamp 10 to the gen set 15. At least one mounting clamp 10 is secured to each side of the gen set 15. When mounting the gen set 15 to the thermal freight container, if the stop 40 on each mounting clamp 10 is not in the upward vertical unclamp position, as shown in FIGS. 2 and 4, the locking means 55 is lifted upward, as shown by the phantom lines 160 and the arrow 180 in FIG. 3, so that the handle means 50 may be rotated to cause the stop 40 to rotate into an upward vertical unclamp position (as shown in FIG. 4). Once the stop 40 is rotated to the upward vertical unclamp position, the hinge 145 will automatically drive the hinge arm 150 into the slot 125 of the control 115 and cause the locking means 55 to lock the rotational motion of the handle means 50 into the upward vertical unclamp position; this in turn will lock the stop 40 in the upward vertical unclamp position. Either the control 115 or the index pin 135 may be used to rotate the handle means 50.

For ease of installation, the present invention allows shaft movement along its axis 95, as shown in FIG. 2 by the solid and phantom lines of the fastening means 60 and the stop 40. This movement of the shaft 20 along its axis 95 allows the shaft 20 to extend to an extended position 185 and to retract to a retracted position 190 during installation (shown in FIG. 3). As the stops 40 on the mounting clamps 10 on each side of the gen set 15 are inserted into the openings 30 of the ISO corner castings 25 the stops 40 are moved to the extended position 185. This extended position 185 provides a distance 195 (shown in FIG. 3) between the stop and the inner face of the ISO casting wall 105. The distance 195 provides a tolerance as the stops 40 on each side of the gen set 15 are inserted into the openings 30. As a result precise alignment of the gen set 15 and the ISO corner casting 25 is not required as the stops 40 are inserted into the openings 30.

Referring to FIGS. 1, 2, a block 75 is structurally attached to the side of the second end 69 of the plate 65 facing the ISO corner casting 25. The block 75 protrudes to a determined distance 200, such that when the stop 40 is both in the upward vertical unclamp position and in the retracted position 190, the block face 205 substantially meets the inner face 42 of the stop 40; this provides protection for the stop 40 from impact damage which may occur from accidental bumping or jarring during the installation process.

Referring to FIG. 3, once the extended portion 81 of the support housing 80 is received into the opening 30, the portion 81 cooperates with the opening 30 to transfer the load of the gen set 15 to the ISO corner castings 25. Once the stops 40 are inserted into the openings 30 in the ISO corner castings 25, the locking means 55 is lifted upward, as shown by the phantom lines 160 and the arrow 180, so that the handle means 50 may be rotated to cause the stop 40 to rotate to a horizontal clamp position as shown in FIGS. 3, 5. As the stop 40 is rotated to the horizontal clamp position, the hinge 145 will automatically drive the hinge arm 150 into the slot 120 of the control 115 and cause the locking means 55 to lock the rotational motion of the handle means 50 into the horizontal clamp position; this in turn will lock the stop 40 into the horizontal clamp position. Either the control 115 or the index pin 135 (shown in FIG. 5) may be used to rotate the handle means 50. To complete the clamping procedure, the fastening means 60 on each mounting clamp 10 is adjusted to pull the stops 40 toward the retracted position 190 and firmly against the ISO corner casting walls 105 such that the inner face 42 of the stop 40 and the ISO casting walls 105 cooperate structurally to provide a strong clamp; this clamping action is shown in FIG. 3 by the phantom and solid lines of the fastening means 60 and the stop 40.

One advantage of this clamping action is that the adjustment of the fastening means 60 is done with modest effort while simultaneously compensating for misalignments of the mounting clamps 10 on each side of the gen set 15. Additionally, the present invention eliminates the need for protruding elements that are susceptible to damage during the installation or removal of the gen set 15. Finally, the disassembly of the present invention only requires the easy removal of the retaining ring 45, the fastening means 60, and the handle means 50 which then allows the shaft 20 to be simply pulled from the base means 35; thus, the present invention is easily maintained.

Although the invention has been shown and described with respect to a best mode embodiment thereof, it should be understood by those skilled in the art that various other changes, omissions and additions in the form and detail thereof may be made therein without departing from the spirit and scope of the invention.

What is claimed is:

1. A mounting clamp for mounting a power supply to a thermal freight container, comprising:

(a) a longitudinally extending shaft having first and second ends;

(b) a base means for supporting said shaft in a manner allowing longitudinal movement of said shaft thereof to an extended position, and, away from the extended position, and also allowing rotational movement of said shaft between a clamping and an unclamping position;

(c) a stop attached to said first end of said shaft, said stop being configured to clampingly engage cooperating structure on the container when said shaft is rotated to its clamping position, and is moved away from its extended position;

(d) a fastening means for governing longitudinal movement of said shaft to the extended position and away from the extended position;

(e) handle means operatively engaging said longitudinally extending shaft for causing said shaft to rotate between its clamping position and its unclamping position, said handle means having a clamp position slot and an unclamp position slot; and (f) locking means for locking the rotational movement of said shaft in its clamping position and its unclamping position, said locking means comprising a hinge attached to said base means, a hinge arm locking the rotational motion of said handle means by cooperating with said clamp position slot and said unclamp position slot of said handle means, and a lock bar for cooperation with said fastening means.

2. An apparatus as recited in claim 1 wherein said base means comprises a large L-shaped plate having a first and second end, and a small triangular plate which are interconnected and cooperate to support the mounting clamp.

3. An apparatus as recited in claim 2 wherein said locking means is attached to said small triangular plate of said base means.

4. An apparatus as recited in claim 2 further comprising a block structurally attached to said second end of said large L-shaped plate of said base means such that said block protects said stop from impact damage.

\* \* \* \* \*